United States Patent [19]
Biggiogera et al.

[11] 4,320,265
[45] Mar. 16, 1982

[54] LINE REPEATER FOR TELEPHONE SYSTEM USING RADIO LINKS

[75] Inventors: Giancarlo Biggiogera; Manlio Saba, both of Milan, Italy

[73] Assignee: Societa Italina Telecomunicazioni Siemens S.p.A., Milan, Italy

[21] Appl. No.: 105,871

[22] Filed: Dec. 21, 1979

[30] Foreign Application Priority Data
Dec. 22, 1978 [IT] Italy .............................. 31258 A/78

[51] Int. Cl.³ .......................... H04B 3/36; H04B 7/00
[52] U.S. Cl. ............................. 179/170 R; 179/2 EB; 179/16 EA
[58] Field of Search ............. 179/2 EA, 2 EB, 170 R, 179/16 E, 16 EA; 178/4.1 R, 4.1 A, 70 R, 70 TS; 375/3; 455/14

[56] References Cited
U.S. PATENT DOCUMENTS 3,586,787  6/1971  Vogelman et al. ............. 179/2 EA
3,610,833  10/1971  Lebegue .......................... 179/16 E
4,039,760  8/1977  Gregory et al. ................. 179/2 EA

*Primary Examiner*—Bernard Konick
*Assistant Examiner*—Randall P. Myers
*Attorney, Agent, or Firm*—Karl F. Ross

[57] ABSTRACT

A telephone exchange communicates with a number of scattered local stations via radio links extending from a central terminal to respective peripheral installations each comprising a radio transceiver coupled via a repeater to the line loop of an associated local station. The repeater includes a constant-current generator, combined with a polarity inverter, which is controlled via a logic network in response to signals from the exchange and from the local station (detected by a sensor in the line loop) to reverse the flow of direct current for the transmission of binary pulses to the local station. In the case of a private subscriber, these pulses may be an intermittent square wave generating a ringing signal; in the case of a public pay station they may constitute commands for the collection of tokens or coins.

11 Claims, 9 Drawing Figures

LINE REPEATER FOR TELEPHONE SYSTEM USING RADIO LINKS

FIELD OF THE INVENTION

Our present invention relates to a line repeater for facilitating signal transmission between an exchange or central office and a number of scattered local stations, e.g. in a rural area, by way of radio links forming part of a telephone or other telecommunication system.

BACKGROUND OF THE INVENTION

In a system of the type here contemplated, the local stations communicating with the exchange via respective radio links are connected through the usual line loops with radio transceivers individually assigned thereto; each transceiver and local station may be considered part of a peripheral installation associated with a central radio terminal which is directly linked with the exchange. A line repeater in each peripheral installation is designed to translate certain activating signals from the exchange, received via the associated radio link, into signals capable of being transmitted over the loop to operate certain equipment at the local station. In the case of a private subscriber, for example, an activating signal thus transmitted may be a command to generate ringing current; in the case of a pay station it may be a rate pulse instructing that station to collect a token or coin.

Conventional line repeaters associated with subscriber stations are, therefore, provided with alternating-voltage generators inductively coupled to the line loop for transmitting an operating current, normally of 25 Hz, to the ringer of the local station in response to a corresponding activating signal from the exchange. Such ringing-current generators, which may be of the toroidal-core type, are relatively costly and require elevated supply voltages, e.g. as high as 90 V.

OBJECTS OF THE INVENTION

The principal object of our present invention is to provide a simple and economic line repeater for the purpose described above.

A more particular object is to provide a line repeater responsive to a variety of commands from the exchange, including not only ringing signals but also rate pulses or the like.

SUMMARY OF THE INVENTION

A line repeater according to our present invention comprises a constant-current generator provided with polarity-inverting means connected across a pair of conductors which are coupled to the associated line loop, the polarity-inverting means being responsive to switching signals emitted by logic circuitry for reversing the current flow in these conductors to generate at least one binary pulse at the associated local station. The logic circuitry has a first input connection from the associated transceiver and a second input connection from the line loop for emitting such a switching signal under the control of an activating signal originating at the exchange and for terminating the switching signal under the control of a response signal initiated by the local station.

The polarity-inverting means may comprise, pursuant to a more particular feature of our invention, two pairs of electronic switches forming opposite arms of a bridge circuit which has one diagonal connected across a d-c supply, the aforementioned conductors being connected across the other bridge diagonal. The constant-current generator includes at least one electronic switch of each pair and voltage-stabilizing means in an input circuit of that switch; when the switch is designed as a transistor, the voltage-stabilizing means may comprise a current-limiting resistor connected to the emitter and one or more Zener diodes connected across that resistor and the base/emitter junction of the transistor.

If the activating signal triggering the logic circuitry of our improved line repeater into the emission of a switching signal is a ringing command, that logic circuitry comprises pulse-generating means producing an intermittent square wave at a low audio frequency such as the aforementioned 25 Hz to simulate a ringing current, the switching signal being then constituted by that square wave and being emitted by gating means in the presence of a ringing command and in the absence of a response signal indicating that the subscriber at the local station has lifted the receiver off the hook.

Alternatively, or in addition, the logic circuitry may comprise a flip-flop which is set by the activating signal and reset by the response signal in order to give rise to a single binary pulse transmitted to the local station. Such a pulse may actuate, for example, a relay for the release of an inserted token or coin at a pay station, the dropping of that token or coin into the collection box then tripping a switch which briefly open-circuits the line loop to produce the response signal.

In practice, the response signal fed to the logic circuitry of the line repeater may be generated by a sensor detecting either the opening or the closure of the line loop. Advantageously, electro-optical couplers are used for galvanically separating the logic circuitry of the line repeater both from the sensor and from the polarity-inverting constant-current generator.

BRIEF DESCRIPTION OF THE DRAWING

The above and other features of our present invention will now be described in detail with reference to the accompanying drawing in which.

SPECIFIC DESCRIPTION

Figure 1:
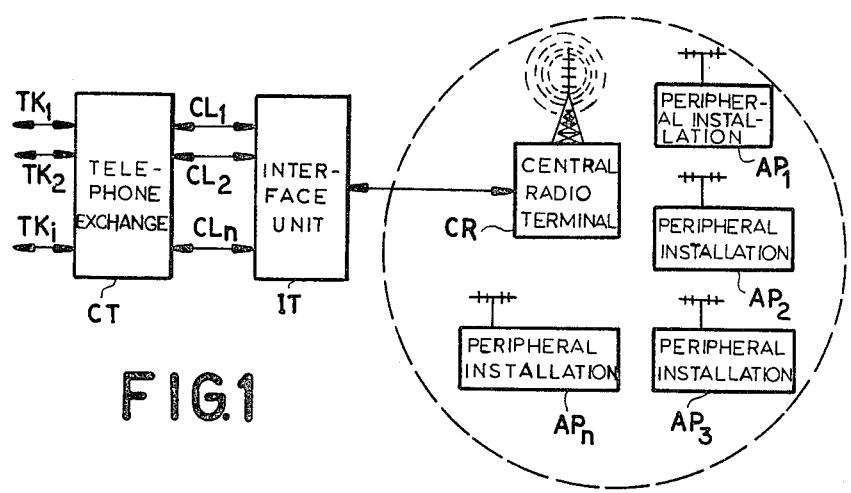
FIG. 1 is a diagrammatic overall view of a telephone system using radio links between a central station and a plurality of peripheral installations including line repeaters according to our invention.

In FIG. 1 we have shown at CT a telephone exchange communicating on the one hand with a multiplicity of trunk lines $TK_1, TK_2, \ldots TK_i$ and on the other hand, by way of connecting lines $CL_1$, $CL_2$, ... $CL_n$ and an interface unit IT, with a central radio terminal CR. A multiplicity of peripheral installations $AP_1$, $AP_2$, $AP_3$, ... $AP_n$ are in two-way radio communication with terminal CR.

Figure 2:
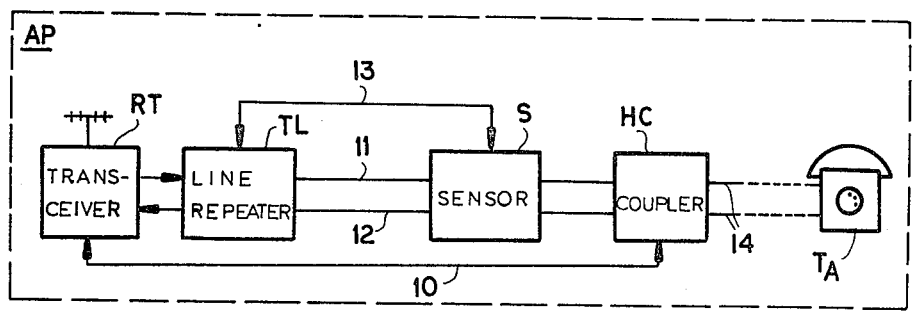
FIG. 2 is a block diagram of a peripheral installation shown in FIG. 1.

A representative peripheral installation AP, shown in FIG. 2, comprises a radio transceiver RT dialoguing with a line repeater TL and, via a bidirectional talking connection 10, with a coupler HC of the hybrid-coil type which is linked with a local telephone station TA by a line loop 14. Also coupled to the line loop is a sensor S which is connected to line repeater TL by a pair of d-c conductors 11, 12 and by a signaling wire 13. Transceiver RT includes conventional means for decoding incoming supervisory signals or commands relating to the establishment or termination of a connection, originating at the exchange CT of FIG. 1, and for encoding similar outgoing signals initiated at local station TA.

Figure 3:
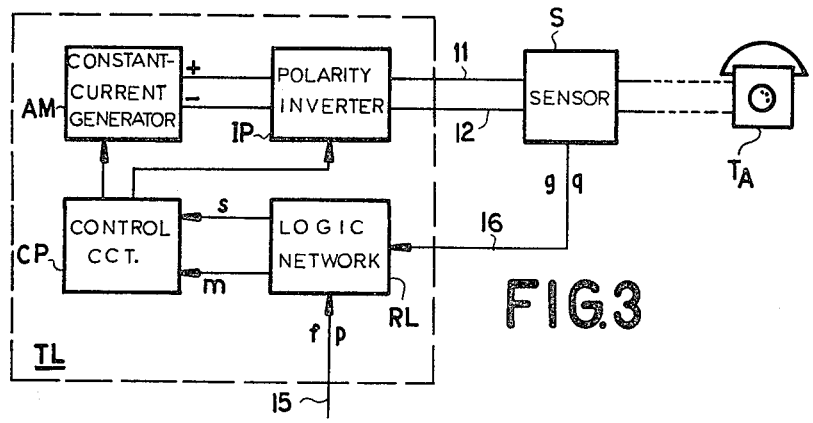
FIG. 3 is a more detailed diagram of a line repeater included in the peripheral installation of FIG. 2.

As shown in FIG. 3, line repeater TL comprises a constant-current generator AM associated with a polarity inverter IP, a logic network RL with input connections 15 from transceiver RT (FIG. 2) and 16 from sensor S, and a circuit CP controlling components AM and IP in response to signals from network RL. Connection 15 carries an activating signal which is either a ringing command f or a rate pulse p, depending on whether station TA is a private subscriber or a public pay telephone. Connection 16 carries a response signal g in the first case or q in the second case, signal g indicating closure of the line loop while signal q indicates a brief opening thereof by a dropping coin or token as mentioned above. Logic network RL emits to control circuit CP a switching signal s accompanied, in the case of a ringing signal, by ancillary pulses m as more fully described hereinafter.

Figure 4:
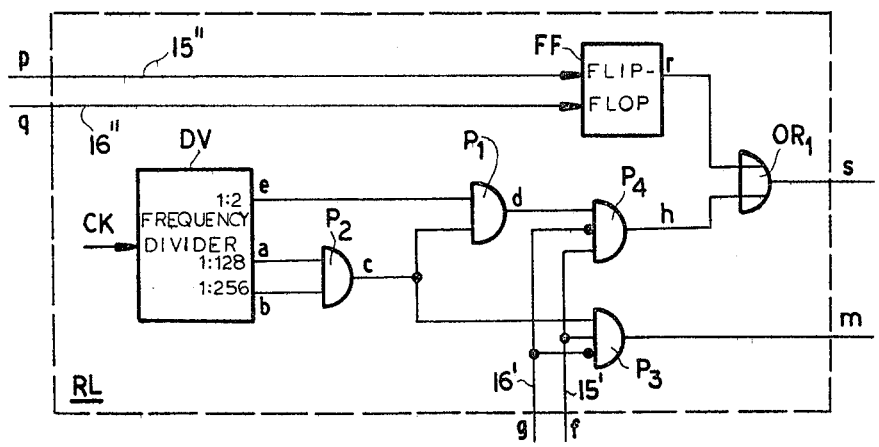
FIG. 4 shows details of a logic network forming part of the line repeater of FIG. 3.

Logic network RL is shown in FIG. 4 to comprise a frequency divider DV stepped by a train of locally generated clock pulses CK of 50 Hz corresponding to a pulse cycle of 20 msec. Divider DV has three sections with step-down ratios of 1:2, 1:128 and 1:256, respectively. The first section produces a pulse train e of 25 Hz, fed to one input of an AND gate $P_1$, while the other two sections produce respective pulse trains a and b with cycles of 2,560 and 5,120 msec fed to inputs of an AND gate $P_2$. Pulses c appearing in the output of gate $P_2$ are delivered on the one hand to the second input of gate $P_1$ and on the other hand to a noninverting input of a further AND gate $P_3$ having a noninverting second input and an inverting third input respectively connected to leads 15' and 16' (included in connections 15 and 16) for receiving the activating signal f and the response signal g discussed with reference to FIG. 3. Pulses c have a duration $T_1$ of 1,280 msec, corresponding to that of pulses a, and are separated by intervals $T_2$ of three times that length, i.e. 3,840 msec. These pulses c are modulated in the output of AND gate $P_1$ by the audio-frequency pulse train e to generate an intermittent square wave d simulating a ringing current; the length of a ring, $T_1$, is on the order of one second whereas the intervening pauses $T_2$ are several seconds long.

Figure 5:
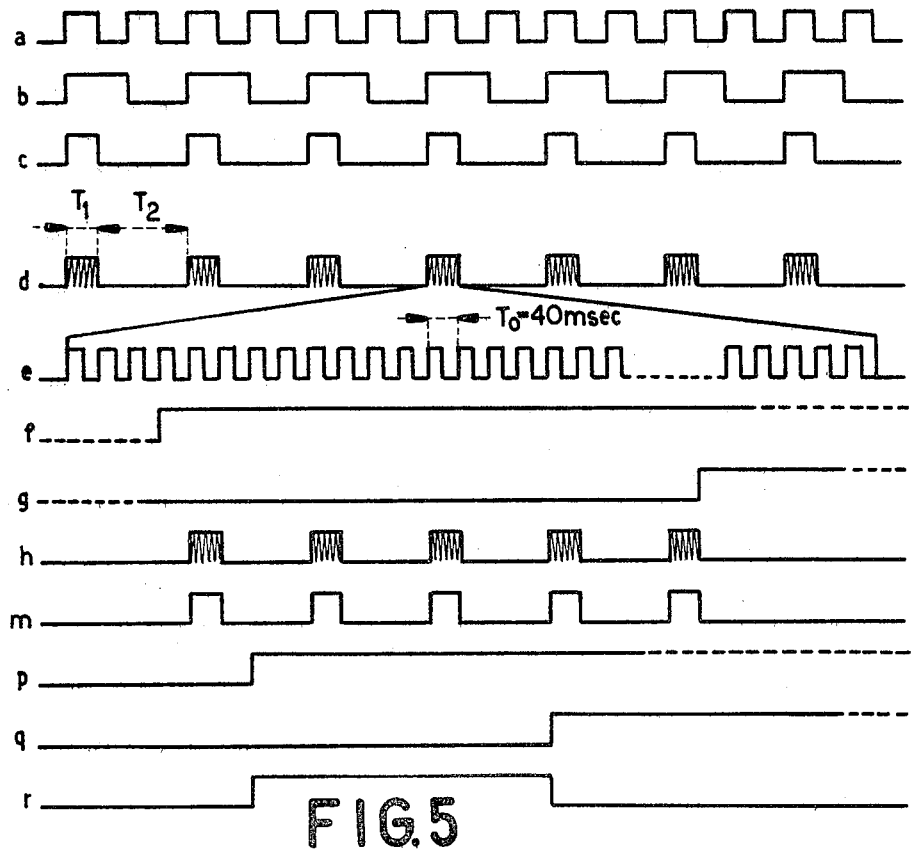
FIG. 5 is a set of graphs relating to the operation of the logic circuitry of FIG. 4.

Pulse trains a–d have been drawn to the same scale in the correspondingly labeled graphs of FIG. 5 whereas pulse train e has been spread out for clarity's sake. FIG. 5 also shows the ringing command f, signaling an incoming call, and the response signal g generated when the called subscriber at station TA lifts the receiver.

The intermittent square wave d from AND gate $P_1$ is fed to a noninverting input of a further AND gate $P_4$ which, like gate $P_3$, receives the signals f and g on a noninverting and on an inverting input connected to leads 15' and 16', respectively. Gate $P_4$ emits a signal h which is identical with signal d but occurs only during the interval between the onset of ringing command f and the arrival of response signal g. Gate $P_3$ emits, during the same interval, the ancillary signal m whose pulses coincide with the bursts of square wave of signal h, as seen in the corresponding graphs of FIG. 5.

Network RL is also shown to comprise a flip-flop FF with a setting input connected to a lead 15" of connection 15 for receiving the activating signal p and a resetting input connected to a lead 16" of connection 16 for receiving the response signal q, its set output carrying a pulse r during the interval between the leading edges of signals p and q (see corresponding graphs in FIG. 5). The two signals h and r from AND gate $P_4$ and flip-flop FF are fed to respective inputs of an OR gate $OR_1$ to produce the switching signal s. It will be understood that, in practice, network RL will generate either the signal h or the signal r, depending on the character of the associated local station TA. for serial production, however, it may be convenient to provide the same type of logic network in all peripheral installations $AP_1$–$AP_n$ of FIG. 1.

Figure 6:
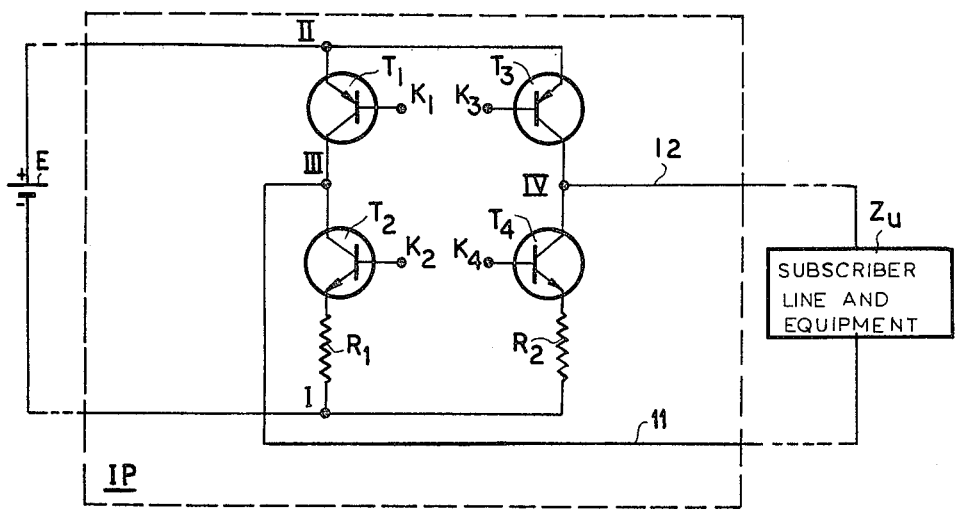
FIG. 6 is a circuit diagram of a polarity inverter forming part of the line repeater of FIG. 3.

The polarity inverter IP of FIG. 3 is shown in FIG. 6 as comprising a bridge circuit with four arms constituted by respective transistors $T_1$–$T_4$. The transistors lying in each pair of opposite bridge arms are of complementary type, namely PNP in the case of transistors $T_1$, $T_3$ and NPN in the case of transistors $T_2$, $T_4$. The latter two transistors are provided with respective emitter resistors $R_1$ and $R_2$ with a common terminal I representing one of the corners of the bridge, this corner being connected to the negative pole of a direct-current source E such as a battery whose positive pole is connected to the opposite bridge terminal II formed by the junction of the emitters of transistors $T_1$ and $T_3$. Conductor 11 extends from a corner III, formed by the junction of the collectors of transistors $T_1$ and $T_2$, whereas conductor 12 extends from the remaining corner IV formed by the junction of the collectors of transistors $T_3$ and $T_4$. These two conductors are schematically shown in FIG. 6 as connected across a load $Z_u$ constituting the impedance of the associated subscriber line and equipment as represented by the components lying to the right of repeater TL in FIGS. 2 and 3.

Figure 7:
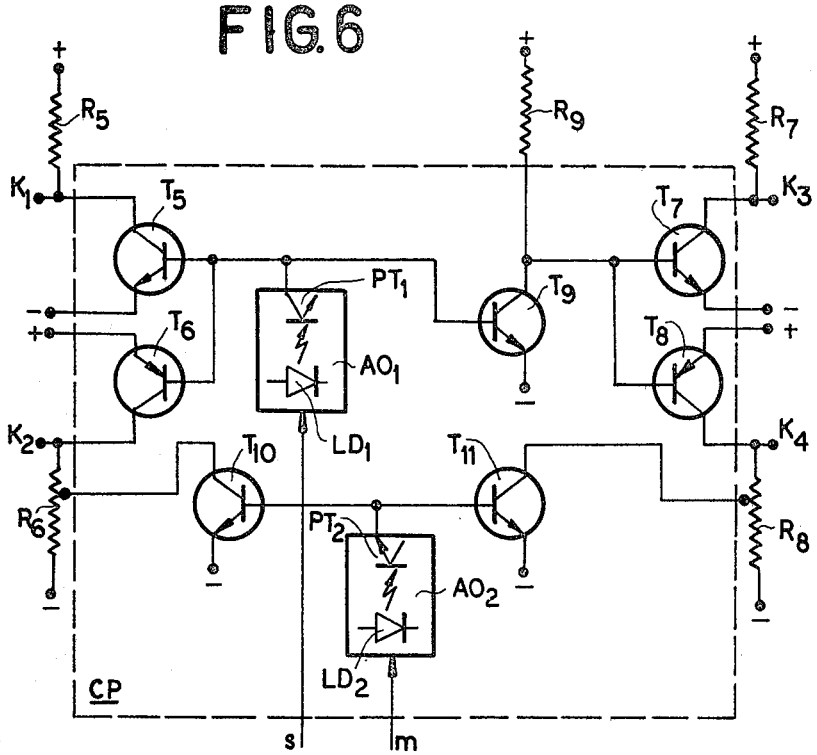
FIG. 7 shows details of a control circuit also forming part of the line repeater.

As more fully described hereinafter, only one pair of complementary transistors $T_1$, $T_4$ or $T_2$, $T_3$ is rendered conductive at any time, with the aid of suitable biasing voltages $K_1$–$K_4$ applied to their bases by the control circuit CP. This control circuit, more fully illustrated in FIG. 7, includes a pair of complementary transistors $T_5$ (NPN) and $T_6$ (PNP) generating the biasing voltages $K_1$ and $K_2$ for transistors $T_1$ and $T_2$, another pair of complementary transistors $T_7$ (NPN) and $T_8$ (PNP) generating the biasing voltages $K_3$ and $K_4$ for transistors $T_3$ and $T_4$, and an inverting transistor $T_9$ of NPN type. The collectors of transistors $T_5$–$T_9$ receive operating potentials of the proper polarity by way of respective biasing resistances $R_5$–$R_9$. The bases of transistors $T_7$ and $T_8$ are jointly connected to the collector of inverting transistor $T_9$ whose own base is connected, together with those of transistors $T_5$ and $T_6$, to a phototransistor $PT_1$ forming part of an electro-optical coupler $AO_1$ which has a light-emitting diode $LD_1$ energizable by the switching signal s from logic network RL. In the absence of this switching signal, the output voltage of coupler $AO_1$ is high whereby transistors $T_5$, $T_9$ and $T_8$ are saturated while transistors $T_6$ and $T_7$ are cut off. Negative voltage $K_1$ and positive voltage $K_4$ then turns on the transistors $T_1$ and $T_4$ of polarity inverter IP (FIG. 6) whereby current flows from positive battery via bridge terminals II and III as well as conductor 11 into load $Z_u$ and returns by way of conductor 12 and bridge terminals IV and I to negative battery. If, on the other hand, the switching signal s is present at the input of coupler $AO_1$, its output voltage is low to reverse the conduction of all these transistors whereby current flows through load $Z_u$ in the opposite direction, namely from positive battery via bridge terminals II and IV into conductor 12 and from conductor 11 via bridge terminals III and I to negative battery.

Another electro-optical coupler $AO_2$ of control circuit CP receives the ancillary signal m to saturate a pair of NPN transistors $T_{10}$ and $T_{11}$, with bases connected to the phototransistor $PT_2$ of this coupler, in the presence of a current pulse traversing its LED $LD_2$. By short-circuiting part of the associated collector resistances $R_6$ and $R_8$, transistors $T_{10}$ and $T_{11}$ serve to reduce—in a manner to be described—the current which alternately traverses the transistor pairs $T_1$, $T_4$ and $T_3$, $T_2$ in the rhythm of square wave e (FIG. 5) as long as a pulse m is present. The purpose of this reduction in current flow, e.g. from a normal value of 40 mA to 10 mA, will be discussed hereinafter with reference to FIG. 9 and the operation of sensor S.

Figure 8:
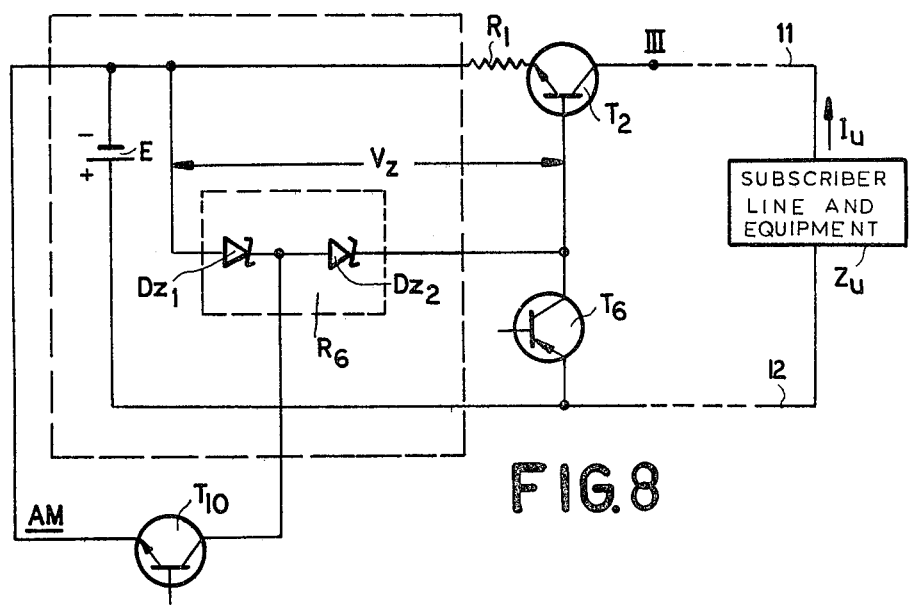
FIG. 8 is a circuit diagram of a constant-current generator associated with the polarity inverter of FIG. 6.

FIG. 8 shows a representative portion of the constant-current generator AM which includes the battery E as well as a voltage stabilizer consisting of two cascaded Zener diodes $Dz_1$, $Dz_2$ connected between the base of bridge transistor $T_2$ and the negative terminal of the battery. Since this negative terminal is connected to the emitter of transistor $T_2$ by way of resistor $R_1$, these two Zener diodes (together representing the collector resistance $R_6$ of transistor $T_6$ shown in FIG. 7) effectively lie in parallel with the series combination of resistor $R_1$ and the base/emitter junction of transistor $T_2$. With transistor $T_6$ conducting, i.e. in the presence of switching signal s as described with reference to FIG. 7, a constant voltage drop $V_z$ is developed across the biasing resistance $R_6$. This voltage drop, obviously, must equal the sum of the base/emitter voltage of transistor $T_2$, which may be regarded as constant, and the voltage drop across emitter resistor $R_1$ which is traversed by the load current $I_u$. This load current, therefore, must also be constant wherefore the arrangement of FIG. 8 operates as a constant-current generator.

An identical voltage stabilizer, not shown, is connected between the base of transistor $T_4$ and negative battery so as to bridge the emitter/base junction of that transistor and its emitter resistor $R_2$. With transistors $T_2$ and $T_4$ alternatively turned on, the load current $I_u$ will be of constant magnitude regardless of its direction of flow.

FIG. 8 further shows transistor $T_{10}$ connected across one of the two cascaded Zener diodes, namely diode $Dz_1$. When transistor $T_{10}$ saturates in the presence of an ancillary pulse m, as described above with reference to FIG. 7, Zener diode $Dz_1$ is short-circuited and the voltage $V_z$ is correspondingly reduced, e.g. to about one-fourth of its normal value, which results in a corresponding reduction in the magnitude of load current $I_u$. Transistor $T_{11}$ (FIG. 7) has an analogous function with regard to the two cascaded Zener diodes making up the biasing resistance $R_8$ of transistor $T_8$ which controls the conduction of bridge transistor $T_4$. Thus, signal m decreases the magnitude of the current flow through conductors 11 and 12 in both directions during the 25-Hz alternation of the load current caused by the ringing signal h giving rise to switching signal s. Since with the described embodiment the transistor $T_2$ does not conduct in the absence of this switching signal, the full voltage drop $V_z$ will be developed across diodes $Dz_1$ and $Dz_2$ only when signal s is caused by high voltage r on the set output of flip-flop FF (FIG. 4). In the nonillustrated branch of circuit AM, however, no part of biasing resistance $R_8$ will be short-circuited by transistor $T_{11}$ in the absence of ringing current since bridge transistor $T_4$ is normally conductive. Obviously, short-circuiting transistor $T_{10}$ could be omitted when flip-flop FF is not used whereas both transistors $T_{10}$ and $T_{11}$ would be redundant in a situation (e.g. with a pay station) in which no ringing current is to be generated in response to an activating signal from the exchange.

Figure 9:
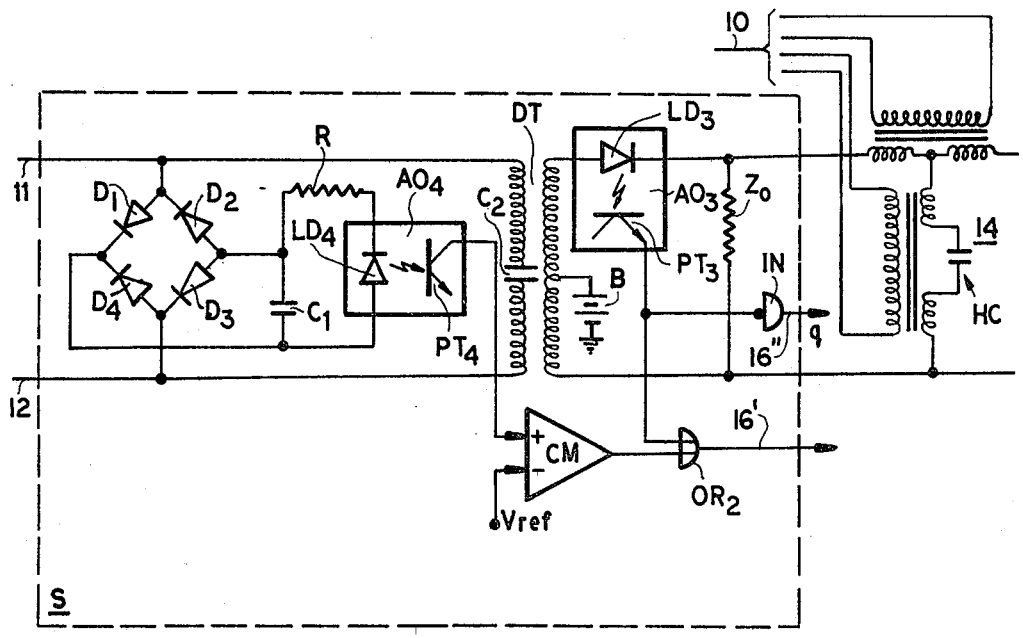
FIG. 9 is a circuit diagram of a line-loop sensor included in the peripheral installation of FIG. 2.

In FIG. 9 we have illustrated details of sensor S which detects the operational state of the local station TA, i.e. whether or not its hook switch closes the line loop 14. Conductors 11 and 12, energized with direct current from polarity inverter IP, are connected across an input diagonal of a rectifier bridge formed from diodes $D_1$–$D_4$ whose output diagonal is connected across a storage capacitor $C_1$ shunted by the series combination of a resistor R and a LED $LD_4$ forming part of an electro-optical coupler $AO_4$ whose phototransistor $PT_4$ works into one input of a voltage comparator CM receiving on its other input a reference potential $V_{ref}$. Conductors 11 and 12 are further coupled, for alternating current, to loop 14 via an isolating transformer DT whose primary winding includes a series capacitor $C_2$. The secondary winding of transformer DT has its midpoint connected to one pole (here positive) of a d-c source B whose other pole is grounded whereby current may be caused to flow through either or both branches of the line loop upon a selective grounding thereof at station TA. Another LED $LD_3$ in series with one of these branches forms part of a further electro-optical coupler $AO_3$ whose phototransistor $PT_3$ works into an OR gate $OR_2$, as does the comparator CM. The output of OR gate $OR_2$ is the lead 16' (cf. FIG. 3) carrying the response signal g. An inverter IN also connected to the output of coupler $AO_3$ generates on its output lead 16" the response signal q in an installation in which that signal is required, i.e. where station TA is a pay telephone. FIG. 9 also shows the hybrid coil HC inserted in the loop 14 between station TA (not seen in FIG. 9) and a balancing impedance $Z_o$, this hybrid coil being transformer-coupled in the usual manner to two pairs of talking wires forming part of connection 10. When the line loop is closed at station TA, LED $LD_3$ is forwardly biased so as to pass the voice currents coming in from that station or from the exchange CT (FIG. 1) by way of connection 10.

In the quiescent state, with the line loop open, load current $I_u$ flows in the aforedescribed manner from polarity inverter IP to sensor S via conductor 11 and back to that inverter by way of conductor 12 after passing through diode $D_1$, LED $LD_4$, resistor R and diode $D_3$. Capacitor C is thereby charged to a high voltage while the conduction of LED $LD_4$ renders phototransistor $PT_4$ conductive to produce a low voltage in the positive input of comparator CM which therefore emits no output signal.

When an incoming call intended for station TA (assumed to be that of a private subscriber) causes a ringing command f to appear on the input lead 15' of logic network RL, conductors 11 and 12 are traversed by bursts of 25-Hz alternating current at a reduced amplitude, as described above. The reduction in the amplitude of this a-c signal is desirable since the a-c impedance seen by polarity inverter IP is substantially less than the corresponding d-c impedance. The ringing signal h is rectified by bridge $D_1-D_4$ so that LED $LD_4$ and resistor R are still traversed by a current sufficient to prevent energization of the output lead 16' of comparator CM. When the subscriber at station TA answers the call and closes the line loop, the effective circuit impedance is further reduced, resulting in a voltage drop across conductors 11 and 12 which is detected by the sensor S as the lessened illumination of phototransistor $PT_4$ raises the output voltage of coupler $AO_4$ and causes the energization of lead 16' by a response signal g. This cuts off the ringing signal h and, in a conventional manner not relevant to our present invention, informs the exchange that a connection has been established, thereby terminating the transmission of activating signal f.

Response signal g is also produced by the current traversing LED $LD_3$ upon closure of line loop 14, with illumination of phototransistor $PT_3$ in coupler $AO_3$. The high voltage from this coupler de-energizes the output 16" of inverter IN, such closure being initiated in the case of a pay station by a deposit of the necessary number of tokens or coins prior to the initiation of an outgoing call. When the connection to the called subscriber is established, the exchange CT sends out a rate pulse P which sets the flip-flop FF of FIG. 4 and, in the aforedescribed manner, causes the circuit of FIG. 6 to reverse the flow of load current $I_u$ in conductors 11 and 12. The resulting current pulse is transmitted by transformer DT and the line loop 14 to station TA so as to actuate the collection relay, letting the coin or token drop into the box while tripping a switch which briefly opens the line loop and gives rise to the response signal q in the output of inverter IN, thereby resetting the flip-flop FF.

It will be apparent that the current detector $AO_3$ can be used with either type of local station to produce the response signal g or q, as the case may be, eliminating the need for the voltage sensor represented by rectifier bridge $D_1-D_4$, capacitor $C_1$ and electro-optical coupler $AO_4$. Such a voltage sensor, on the other hand, may be conveniently used in an installation lacking the battery B so that a current sensor such as coupler $AO_3$ would be ineffectual. However, an inclusion of both types of detector in one and the same sensors S may be desirable for purposes of serial production.

We claim:

1. In a telecommunication system wherein an exchange communicates with a plurality of local stations via respective radio links extending between a central terminal and a plurality of transceivers coupled by way of respective repeaters and line loops with said local stations, the latter having equipment operable by activating signals from said exchange, the improvement wherein each of said repeaters comprises:

a constant-current generator provided with polarity-inverting means connected across a pair of conductors coupled to the associated line loop;

sensing means connected to said line loop for detecting the operational state of the associated local station and emitting a response signal upon ascertaining a predetermined change in said operational state;

logic circuitry with a first input connection from the associated transceiver and with a second input connection from said sensing means for emitting a switching signal under the control of an activating signal originating at said exchange and terminating said switching signal under the control of a response signal initiated by the associated local station; and control means responsive to said switching signal inserted between said logic circuitry and said polarity-inverting means for reversing the current flow in said conductors to generate at least one binary pulse at said local station.

2. A telecommunication system as defined in claim 1 wherein said polarity-inverting means comprises two pairs of electronic switches forming respective pairs of opposite arms of a bridge circuit having one diagonal connected across a d-c supply, said pair of conductors being connected across the other diagonal of said bridge circuit, said pairs of electronic switches having control electrodes connected to said logic circuitry for respective energization with switch-closing and switch-opening voltages.

3. A telecommunication system as defined in claim 2 wherein said constant-current generator includes at least one electronic switch of each of said pairs and voltage-stabilizing means connected in an input circuit thereof.

4. A telecommunication system as defined in claim 3 wherein said electronic switches are transistors with bases constituting said control electrodes and with emitters forming part of their input circuits, said voltage-stabilizing means comprising a current-limiting resistor connected to the emitter of said one electronic switch and Zener-diode means connected across said current-limiting resistor and the base/emitter junction of said one electronic switch.

5. A telecommunication system as defined in claim 4 wherein said Zener-diode means comprises a plurality of Zener diodes in cascade, further comprising a shunt switch controlled by said logic circuitry for short-circuiting at least one of said Zener diodes to reduce the magnitude of said current flow in the presence of said switching signal.

6. A telecommunication system as defined in claim 1, 2, 3, 4 or 5 wherein said control comprises electro-optical coupling means inserted in the path of said switching signal for galvanically separating said logic circuitry from said constant-current generator and said polarity-inverting means.

7. A telecommunication system as defined in claim 1 wherein said logic circuitry comprises pulse-generating means producing an intermittent square wave at a low audio frequency, simulating a ringing current, and gating means provided with said first and second input connections for emitting said switching signal by giving passage to said square wave in the presence of said activating signal and in the absence of said response signal.

8. A telecommunication system as defined in claim 7 wherein said pulse-generating means comprises a frequency divider driven by a train of clock pulses, said frequency divider having a first output on which said square wave appears during ringing periods on the order of one second separated by substantially longer pauses, said frequency divider further having a second output connected by way of said gating means to said constant-current generator for reducing the magnitude of said current flow in said conductors during ringing periods in which said current flow is periodically reversed by said polarity-inverting means in response to said switching signal.

9. A telecommunication system as defined in claim 1 wherein said logic circuitry comprises a flip-flop provided with said first and second input connections for setting by said activating signal and resetting by said response signal.

10. A telecommunication system as defined in claim 1, 7, 8 or 9 wherein said sensing means comprises a voltage detector connected across said conductors and a voltage comparator with one input connected to a source of reference potential and with another input energized from said voltage detector through an electro-optical coupler.

11. A telecommunication system as defined in claim 1, 7, 8 or 9 wherein said sensing means comprises a current detector including a light-emitting diode in said line loop and a phototransistor juxtaposed with said light-emitting diode for illumination thereby.

* * * * *